United States Patent
Nishikawa et al.

(10) Patent No.: US 9,353,829 B2
(45) Date of Patent: May 31, 2016

(54) CHAIN BEARING, CHAIN PIN, AND CHAIN

(71) Applicant: DAIDO KOGYO CO., LTD., Ishikawa Pref. (JP)

(72) Inventors: Masashi Nishikawa, Ishikawa Pref. (JP); Yoshio Okumura, Ishikawa Pref. (JP); Yuma Ohsaka, Ishikawa Pref. (JP); Motoki Tanaka, Ishikawa Pref. (JP)

(73) Assignee: DAIDO KOGYO CO., LTD., Ishikawa Pref. (JP)

( * ) Notice: Subject to any disclaimer, the term of this patent is extended or adjusted under 35 U.S.C. 154(b) by 0 days.

(21) Appl. No.: 14/514,677

(22) Filed: Oct. 15, 2014

(65) Prior Publication Data

US 2015/0111676 A1 Apr. 23, 2015

(30) Foreign Application Priority Data

Oct. 21, 2013 (JP) .................. 2013-218483

(51) Int. Cl.
*F16G 13/02* (2006.01)
*F16G 13/04* (2006.01)
*F16G 13/06* (2006.01)
*F16G 13/08* (2006.01)
*F16G 13/18* (2006.01)

(52) U.S. Cl.
CPC ............. *F16G 13/04* (2013.01); *F16G 13/02* (2013.01); *F16G 13/06* (2013.01); *F16G 13/08* (2013.01); *F16G 13/18* (2013.01)

(58) Field of Classification Search
CPC ............ C22C 38/04; C21D 2211/002; C21D 2211/008; C21D 6/02; C21D 7/12
USPC ......................... 474/206, 212, 213
See application file for complete search history.

(56) References Cited

U.S. PATENT DOCUMENTS

| 4,144,378 | A | * | 3/1979 | Kim | .......................... | C23C 2/12 |
|---|---|---|---|---|---|---|
| | | | | | | 420/117 |
| 4,818,351 | A | * | 4/1989 | Arai | ........................ | C23C 12/02 |
| | | | | | | 148/218 |
| 5,531,842 | A | * | 7/1996 | Koo | .......................... | C21D 6/02 |
| | | | | | | 148/653 |
| 5,545,269 | A | * | 8/1996 | Koo | .......................... | C21D 6/02 |
| | | | | | | 148/653 |
| 5,545,270 | A | * | 8/1996 | Koo | .......................... | C21D 6/02 |
| | | | | | | 148/593 |
| 5,653,826 | A | * | 8/1997 | Koo | .......................... | C21D 6/02 |
| | | | | | | 148/328 |
| 5,876,521 | A | * | 3/1999 | Koo | .......................... | C21D 6/02 |
| | | | | | | 148/328 |

(Continued)

FOREIGN PATENT DOCUMENTS

| JP | 63-35764 | 2/1988 |
|---|---|---|
| JP | 2002-130384 | 5/2002 |

(Continued)

OTHER PUBLICATIONS

Extended European Search (ESR) issued Apr. 15, 2015 in corresponding European Patent Application No. 14189415.4.

*Primary Examiner* — Henry Liu
(74) *Attorney, Agent, or Firm* — Wenderoth, Lind & Ponack, L.L.P.

(57) ABSTRACT

At least one member composing a chain bearing, such as a pin, includes a surface layer composed of vanadium carbonitride (VCN) coating on a surface of a base material of the at least one member. An oxide (VO) film having a predetermined thickness is also formed on a surface of the surface layer such that the oxide film is interposed between the surface layer and another member, such as a pin hole, composing the chain bearing.

12 Claims, 10 Drawing Sheets

(56) References Cited

U.S. PATENT DOCUMENTS

| | | | | |
|---|---|---|---|---|
| 5,900,075 A * | 5/1999 | Koo | ................ | C21D 6/02 148/328 |
| 2002/0049107 A1* | 4/2002 | Ledvina | ................ | F16G 13/04 474/213 |
| 2002/0119852 A1* | 8/2002 | Tada | ................ | F16G 13/02 474/212 |
| 2006/0172842 A1* | 8/2006 | Kamon | ................ | B21L 9/02 474/206 |
| 2007/0032325 A1* | 2/2007 | Shimaya | ................ | B21L 9/02 474/213 |
| 2007/0049438 A1* | 3/2007 | Lodge | ................ | F16G 13/06 474/206 |
| 2008/0085798 A1* | 4/2008 | Miller | ................ | B62J 1/28 474/78 |
| 2009/0308499 A1* | 12/2009 | Scott | ................ | C22C 38/02 148/500 |
| 2010/0040502 A1* | 2/2010 | Nazmy | ................ | C22C 38/001 420/40 |
| 2010/0120567 A1* | 5/2010 | Okumura | ................ | C23C 10/14 474/206 |
| 2010/0276038 A1* | 11/2010 | Grellier | ................ | C21D 1/22 148/542 |
| 2011/0287883 A1* | 11/2011 | Ritz | ................ | F16G 13/08 474/213 |
| 2012/0009434 A1* | 1/2012 | Hata | ................ | C21D 6/008 428/577 |
| 2013/0203539 A1* | 8/2013 | Kirchner | ................ | C22C 38/002 474/228 |

FOREIGN PATENT DOCUMENTS

| | | |
|---|---|---|
| JP | 2003-139199 | 5/2003 |
| JP | 2004-502033 | 1/2004 |
| JP | 2004-360755 | 12/2004 |
| JP | 2005-177952 | 7/2005 |
| JP | 2005-299800 | 10/2005 |
| JP | 4401108 | 11/2009 |
| JP | 2012-237062 | 12/2012 |

* cited by examiner

CHAIN BEARING, CHAIN PIN, AND CHAIN

CROSS-REFERENCE TO RELATED APPLICATION

This application claims the benefit of Japanese Patent Application No. 2013-218483, filed on Oct. 21, 2013, which is hereby incorporated by reference herein in its entirety.

BACKGROUND OF THE INVENTION

1. Field of the Invention

The present invention relates to a bearing and a pin for use in a chain and to a chain such as a silent chain and a roller chain using them.

2. Description of the Related Art

In general, a silent chain causes a relative rotational sliding motion between a pin and a link plate, and a roller chain causes a relative rotational sliding motion between a pin and a bushing, so that the pin and the fitting member (the link plate or the bushing) wear and wear elongation is caused within the chains. A silent chain such as a timing chain disposed within an internal combustion engine in particular is required to have high durability even under a condition close to a boundary lubrication state in which sliding heat is concerned.

Hitherto, Japanese Patent No. 4401108 has proposed a chain pin including a surface layer composed of vanadium carbide (VxCy) and a boundary portion composed of carbides of vanadium and chrome between a pin base material and the surface layer. In the chain pin, a chrome content in the boundary portion is changed in inclination such that the chrome content is gradually reduced from the pin base material to the surface layer.

The chain pin has the surface layer composed of the vanadium carbide having high surface durability and the boundary portion composed of the carbides of vanadium and chrome formed in a manner not forming an interface clearly divided to improve adhesion strength between the surface layer and the pin base material, to prevent separation between the surface layer and a boundary surface, and to improve durability of and to prolong a life of the chain.

With a late rise of interest in environmental and energy problems, a demand on sustainable development of an internal combustion engine and others is also increasing and a further improvement on fuel efficiency of an engine-powered vehicle is urgently required. Meanwhile, it has become an important issue how to assure long-term reliability of the timing chain described above. In such a next generation engine, there are such cases that viscosity of lubricant oil is lowered or an amount of lubricant oil is made lean due to the changes of an engine mechanism. A case where a chain lubrication environment is made severe is increasing as a lubrication condition approaches to boundary lubrication even in a case of a mixed lubrication condition. Then, it was found that there is a case that the pin having the surface layer composed of the vanadium carbide described above (referred to as a 'VC pin' hereinafter) causes abnormal wear in such a chain driving test.

As a result of ardent study on the abnormal wear of the VC pin described above, the inventors et al. have analyzed as follows. Firstly, a mechanism why the vanadium carbide (VC) coating has a high wear resistant performance more than that of other MCs (M: metals such as Cr, Nb, V, and Ti) type hard carbide coatings such as chrome carbide (CrC), niobium carbide (NbC), and others in the conventional chain within an engine is:

(i) Because a very thin and soft oxide film is continuously formed on the surface of the VC coating and a pin sliding surface tends to be made into a mirror surface, attackability against another member (surface of a hole of a link plate) is lowered; and (ii) The VC coating has toughness higher than that of the other MC type carbide coatings, so that destruction of the coating (surface roughness caused by micropeeling) hardly advances even under a high contact pressure, and the mirror-surfaced sliding surface can be maintained for a long period of time.

Then, the inventors have presumed that the abnormal wear of the VC pin has occurred in the chain driving test carried out by assuming the next generation engine due to the following reasons. That is, in a circumstance in which the lubrication environment is severe, a lubrication condition of the sliding portions (the surface of the pin and the surface of the hole of the link plate) approaches to the boundary lubrication condition, and the pin surface generates heat, becoming hot. As a result, the oxide film accelerating the drop of the attackability against the other member is formed thickly and the wear of the pin itself is increased because the soft oxide film is worn.

It is assumed that the demand on the chain will become severe more and more with the progress of the internal combustion engine such as further cut of fuel consumption of vehicles. A chain having durability enabling to drive for a long period of time is required even under such circumstances that not only the viscosity of the lubricant oil is lowered but also the lubrication environment is aggravated due to an increase of a chain load tension and others.

SUMMARY OF THE INVENTION

According to one aspect of the invention, a chain bearing includes two members slidably fitting with each other and flexibly connecting links. At least one member composing the chain bearing includes a surface layer composed of a vanadium carbonitride coating formed on a surface of a base material of the one member and containing vanadium, carbon and nitrogen, and an oxide film formed on a surface of the surface layer such that the oxide film is interposed between the surface layer and another member among the two members. The oxide film is formed at a predetermined thickness and id softer than the vanadium carbonitride coating.

According to another aspect of the invention, a chain pin includes a base material, a surface layer formed on a surface of the base material and composed of a vanadium carbonitride coating containing vanadium, carbon and nitrogen, and an oxide film formed on the surface of the surface layer, being softer than the vanadium carbonitride coating, and formed at a predetermined thickness.

According to a still other aspect of the invention, a chain includes a plurality of first links each having pins, and a plurality of second links each having fitting portions fitting the pins, the second links being alternately connected with the first links by the pins fitting into the fitting portions, wherein each pin includes a base material, a surface layer formed on a surface of the base material and composed of a vanadium carbonitride coating containing vanadium, carbon and nitrogen, and an oxide film formed on the surface of the surface layer, being softer than the vanadium carbonitride coating and formed at a predetermined thickness.

Further features of the present invention will become apparent from the following description of exemplary embodiments with reference to the attached drawings. The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENT

Figure 1:
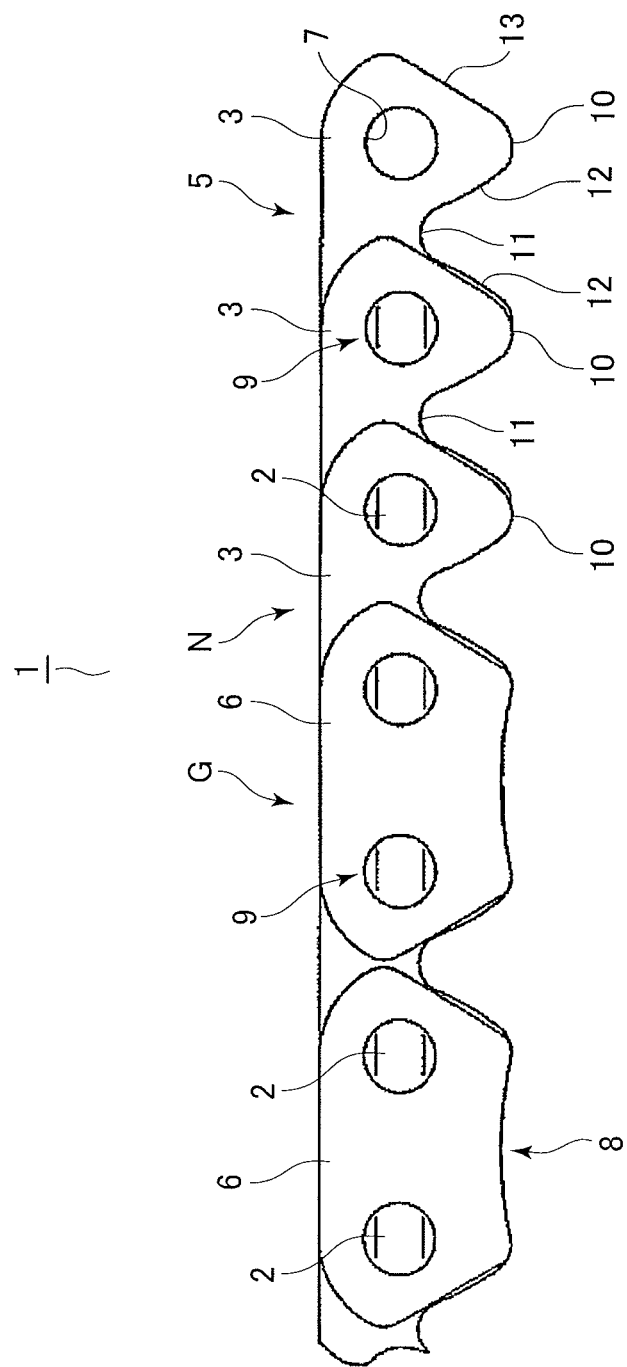
FIG. 1 is a front view showing a silent chain to which the present invention is applicable.

A mode of an embodiment of the present invention will be explained below with reference to the drawings. As shown in FIG. 1, a silent chain 1 to which the present invention is applicable is constructed endlessly by connecting inner link plates 3 alternately by pins 2, and guide link plates 6 are disposed at widthwise outermost sides of (second) links 5 of these inner link plates 3. The pins 2 are fixed and connected to the right and left guide link plates 6 by caulking, tight fitting or the like and slidably fit into pin holes 7 formed at both end portions in a longitudinal direction of the inner link plates, i.e., fitting members, 3. The guide link plates 6 and the pin 2 compose a (first) link 8.

Accordingly, the pin 2 and the pin hole 7 of the link plate 3, i.e., the fitting member fitting the pin 2, compose a chain bearing 9 where they can slide relatively with each other. It is noted that a guide link row G aligned in a width direction of the chain with the guide link plate 6 including the inner link plates 3 does not rotates relatively with respect to the pin 2, and the inner link plates 3 in a non-guide row N adjacent the guide row rotate relatively with respect to the pin 2. Thus, while the silent chain 1 is freely flexible, the same inner link plates 3 are normally used in the guide link row G and the non-guide row N, and each chain bearing 9 described above is constructed between the inner link plate 3, i.e., the fitting member, and the pin 2.

Each of the inner link plates 3 includes a pair of teeth 10 on an inner diameter side of a line (pitch line) connecting centers of the pair of right and left pin holes 7, i.e., fitting portions fitting the pin 2. Inner flank faces 12 are formed on a side of a crotch 11 between the teeth 10 and outer flank faces 13 are formed on outer sides of the respective teeth. The teeth 10 include such an engagement mechanism that the inner flank face 12 and the outer flank face 13 abut against sprocket teeth. For instance, the inner flank face 12 seats on the sprocket teeth after advancing an engagement by the outer flank face 13 abutting against the sprocket teeth (outer crotch abutting, inner crotch seating).

A surface layer composed of a vanadium carbonitride (referred to as 'VCN' hereinafter) coating having a predetermined thickness, e.g., about 6 to 12 µm, is formed on one member composing the chain bearing 9, i.e., the pin 2 in the present embodiment. The VCN coating (VCN film) is formed on the surface layer by a process of forming a vanadium carbide (VC) coating on the surface of the pin base material (vanadium permeating and diffusing process) and a process of permeating nitrogen (N) on the surface of the pin base material (nitriding process).

Specifically, a wire rod made of a steel member, e.g., high carbon chrome bearing steel (SUJ2), chrome molybdenum steel (SCM) or the like is used for the pin base material by cutting into a predetermined length. At first, the pin base material undergoes the vanadium permeating and diffusing process (VC complex diffusing and permeating process) performed by a powder pack method. That is, powder composed of FV (ferrovanadium), i.e., a permeating material, $Al_2O_3$ (alumina, aluminum oxide), i.e., a sintering preventing material, and $NH_4Cl$ (ammonium chloride), i.e., an additive (accelerator), is put into a furnace together with the pin base material. The temperature of the furnace is raised to 900° C. to 1100° C., and they are quenched after keeping the temperature for a predetermined time. Thereby, the vanadium carbide (VC) coating having the predetermined thickness is formed on the surface of the pin base material.

Next, the nitriding treatment of heating the pin intermediate material on which the VC coating (VC film) has been formed is carried out for several hours within a nitrogen atmosphere. That is, $N_2$ gas is fed into the furnace and the pin base material is quenched after heating for several hours at high temperature of more than 1000° C. Thereby, as shown in FIG. 2C, a surface layer 21 composed of the vanadium carbonitride (VCN) coating made of $VC_xN_y$ in which nitrogen (N) is bonded with the VC coating by being diffused and permeated within the VC coating is formed on the surface of the pin base material 20 which is mainly composed of iron Fe, and a content (ratio) of nitrogen (N) changes in inclination such that the nitrogen content (N content) drops gradually from the surface to an interface of the base material. A very thin vanadium oxide (VO) film 22 is formed on a top surface of the surface layer 21 composed of the VCN coating.

Figure 2A:
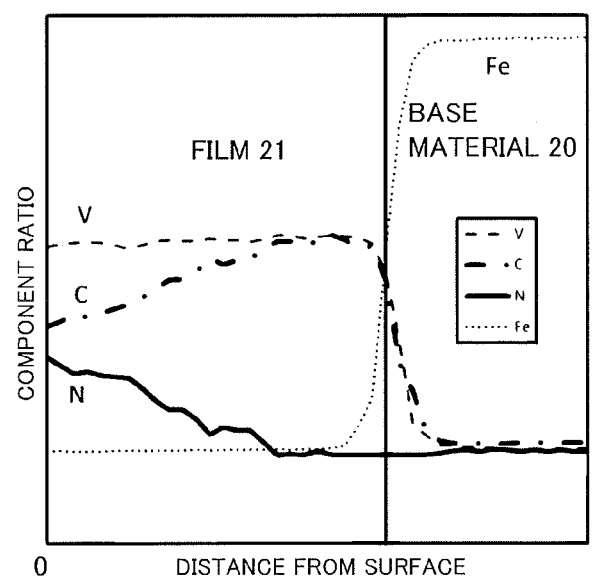
FIG. 2A is a graph showing a component ratio changing by a distance from a surface of a pin.
Figure 2B:
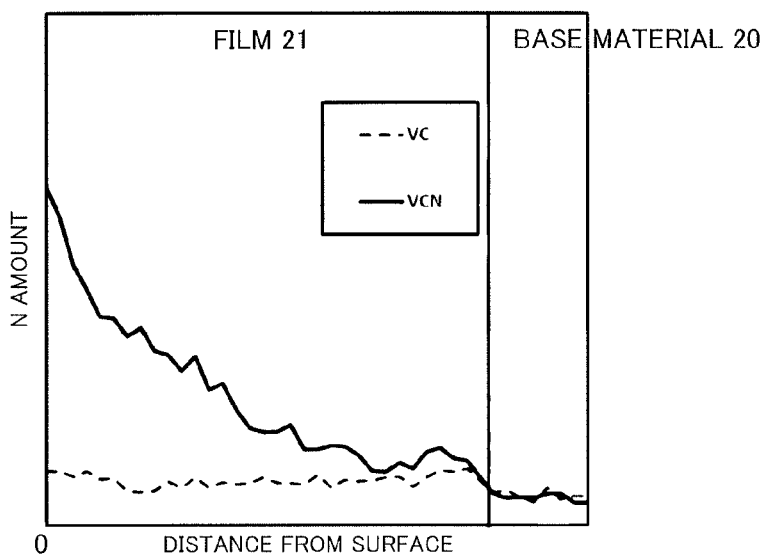
FIG. 2B is a graph showing changes of an amount of nitrogen (N) from the surface of a vanadium carbide (VC) coating and of a carbonitride (VCN) coating of the invention.
Figure 2C:
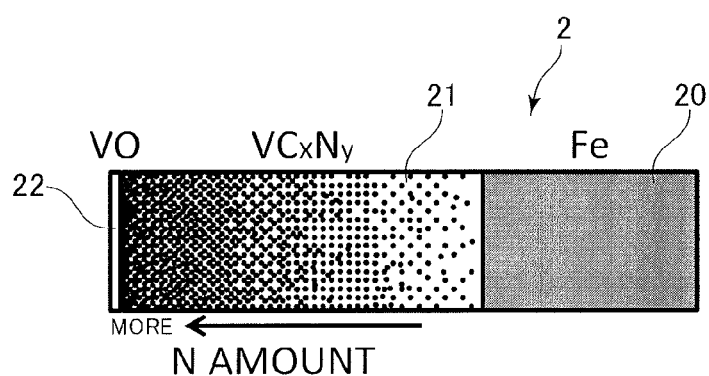
FIG. 2C is a schematic diagram of a pin surface portion.

As shown in FIG. 2A, a main component of the pin base material 20 is iron (Fe), the VCN coating is formed on the surface of the pin base material, and the coating contains vanadium (V) whose content is substantially the same substantially across an entire thickness direction thereof, carbon (C) gradually increasing from the surface to the interface of the base material, and nitrogen (N) gradually decreasing from the surface to the interface of the base material. Still further, as shown in FIG. 2B, although the VCN coating contains a large amount of nitrogen (N) on the surface, the amount decreases gradually toward the interface of the pin base material. It is noted that the amount of nitrogen (N) of the pin containing the vanadium carbide (VC) coating is substantially zero. While the chain pin (one member) 2 repeats relative sliding motions with the pin hole 7 of the inner link plate 3, i.e., the other member composing the chain bearing 9, the oxide (VO) film 22 on the top surface of the VCN coating slides and wears. The oxide (VO) film 22 is softer than the VCN coating on the surface layer 21, thus has less attackability against the pin hole (the other member), and becomes a mirror surface when the film 22 slidably contacts with the pin hole, thus suppressing wear of the pin itself and the pin hole.

Figure 3:
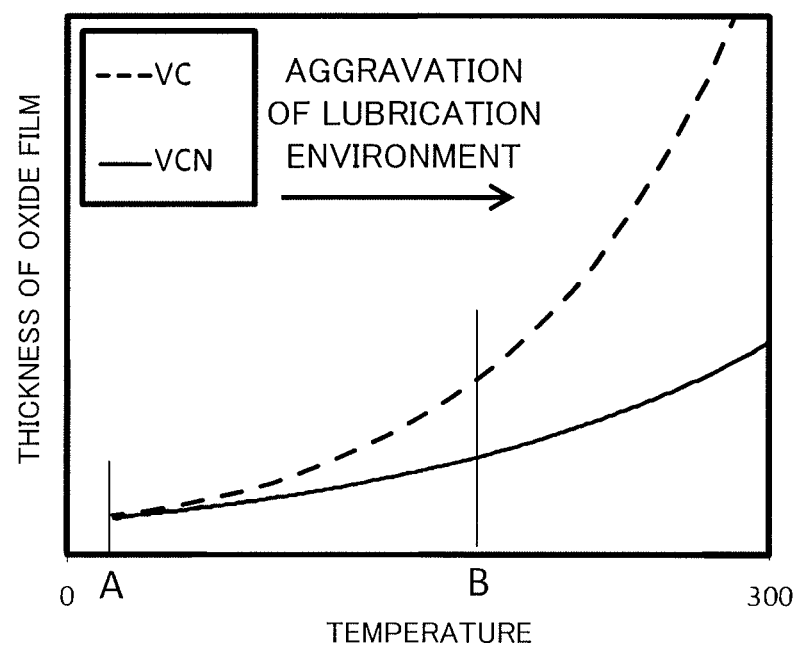
FIG. 3 is a graph showing changes of thicknesses of oxide films of the VC and VCN coatings by temperature.

FIG. 3 is a graph showing changes of thicknesses of the oxide films by temperature of the chain bearing of a timing chain or the like. The inventors et al. have found that the oxide film is formed also when the surface layer is the VC coating and that the oxide (VO) film considerably affects the durability of the chain and traced that in a state where the lubrication environment is not enough, the oxide film is formed excessively in the conventional VC coating and that the excessive oxide film is connected with an increase of wear of the VC pin. In connection with the internal combustion engine, the further improvement of fuel consumption has been demanded and low viscous lubricant oil has been developed to reduce shearing resistance of lubricant oil to lower friction of sliding members. Thus assuming the next generation engine, the lubrication environment within the engine itself is worsened and temperature of the chain bearing tends to be high.

Figure 4:
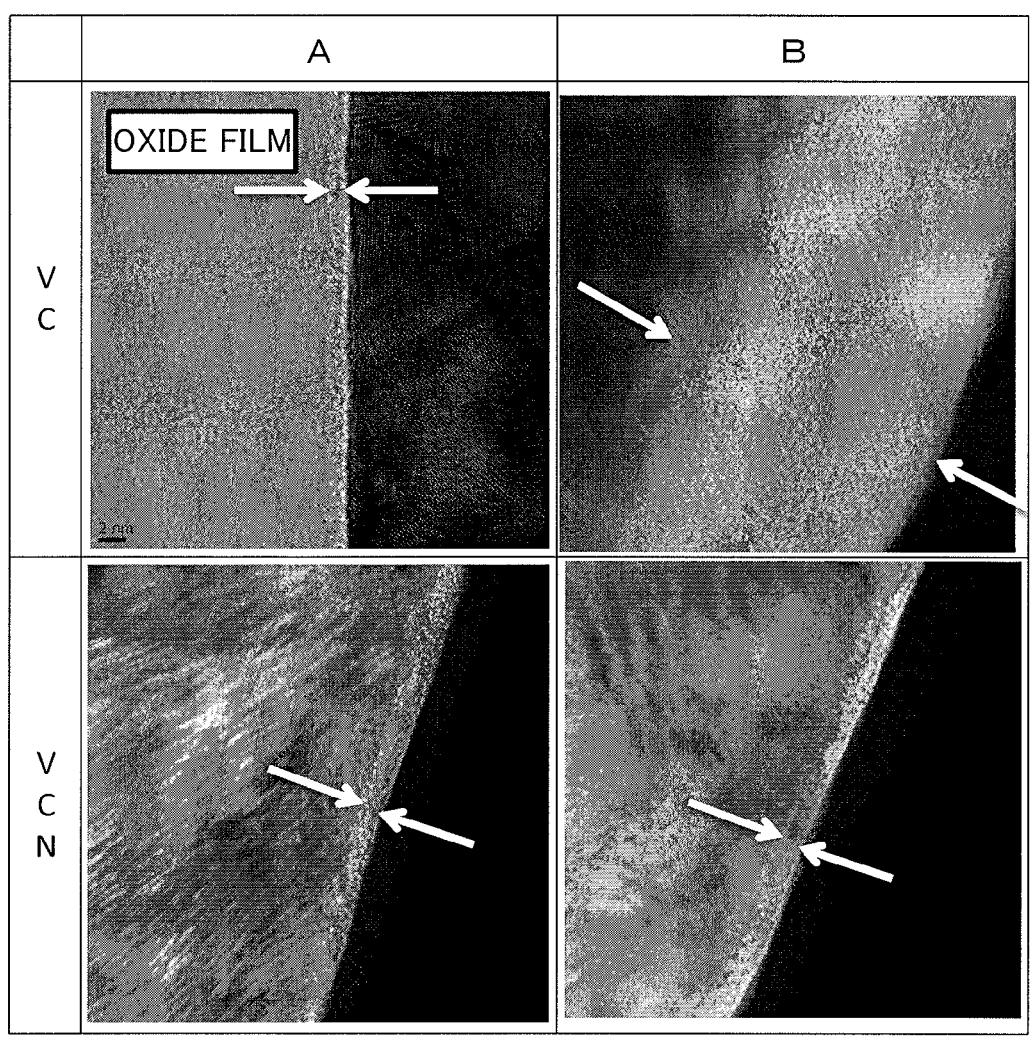
FIG. 4 shows enlarged pictures of the oxide films on surfaces of the VC and VON coatings at points A and B in FIG. 3.

FIG. 4 shows pictures (transmission electron microscope TEM images) of the oxide (VO) films on the surface of the conventional type VC pin and of the VCN pin of the invention taken at a point A in FIG. 3, i.e., a state in which temperature is low (environment within the conventional engine) and in a state of a point B, i.e., a state in which temperature is high (environment within the next generation engine). It is noted that sizes of the original images in FIG. 4 are adjusted to the same magnification. The oxide films of the conventional type VC pin and of the VCN pin of the invention have substantially the same thickness (about 2 nm) at the point A where the temperature of the chain bearing is low. While the oxide film of the VC pin is thickened considerably (thickness exceeding 10 times of that at the point A for example) at the point B where the lubricant environment is aggravated and the temperature of the bearing becomes locally high, the thickness of the oxide film of the VCN pin of the invention changes less (the thickness does not exceed twice of the thickness at the point A for example). FIG. 3 is derived from measuring results of the thicknesses of the oxide films at plurality of temperatures of the VC pin and the VCN pin shown in FIG. 4. While the higher the temperature, the thicker the thickness of the oxide film of the VC pin sharply increases, the changes of the thickness of the oxide film of the VCN pin by the temperature is considerably small as compared to that of the VC pin. It is assumed that the oxide is suppressed from being excessively produced because bond with oxygen (oxidation) is suppressed in the VCN as compared to the VC and the VCN has high oxidation resistance.

Figure 5:
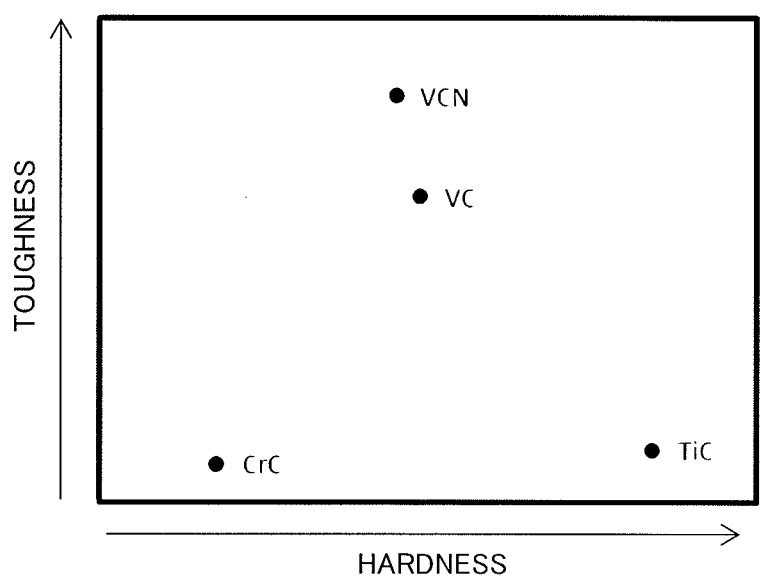
FIG. 5 is a graph showing toughness and hardness of various hard coatings

FIG. 5 shows a relationship between toughness and hardness of the coatings of the respective hard members. The toughness is defined by a parameter of creep calculated by a nano-indentation method, so that its unit is percentage [%]. Considering a destruction model of the coating involving a load of a diamond indenter by a Vickers test for example, the larger the creep, the less the cracks are. This means that the higher the toughness of the coating, the higher the strength of the coating even if a bearing load increases. FIG. 5 indicates that in terms of the hardness, TiC is high, CrC is low, and VCN and VC are intermediate, and that VCN and VC are tough and VCN is higher than VC in particular in terms of the toughness. Accordingly, as compared not only the other materials, i.e., CrC and TiC, but also the VC pin which conventionally excels in a wear performance, the VCN pin is high in terms of toughness, micro destruction of the coating, i.e., roughness of the sliding surface thereof, advances less, attackability thereof against the sliding other member is low, and its wear performance excels.

Figure 6:
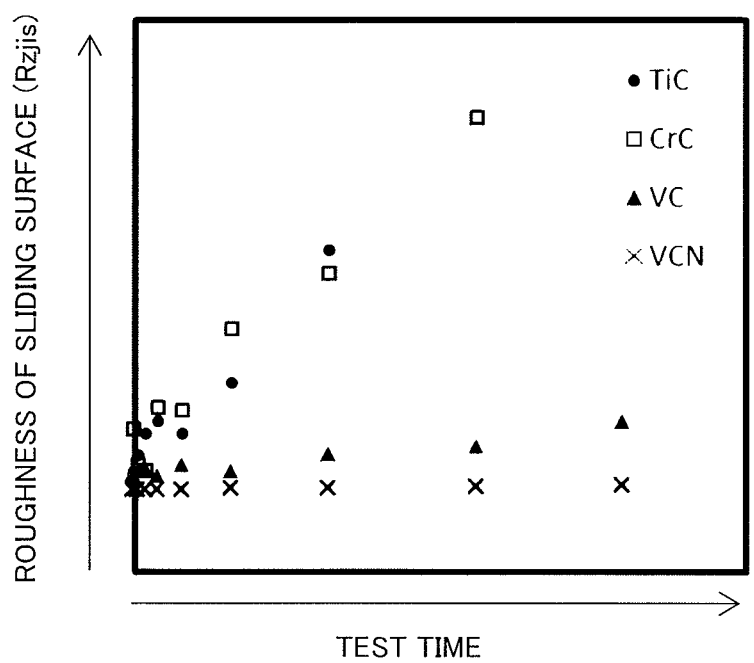
FIG. 6 is a graph showing changes of roughness of sliding surfaces of the various hard coatings by test times

FIG. 6 indicates changes of roughness of sliding surfaces by test times in a state in which a predetermined load is applied to the pins coated with the respective hard coatings (Tic, CrC, VC and VCN). It is noted that the roughness is indicated by using ten-point average roughness Rzj is and its unit is [µm]. It can be seen from FIG. 6 that while the roughness of the sliding surfaces of the VC and VCN coatings are low as compared to the other hard coatings (TiC and CrC) due to the oxide film formed as described above, the VCN coating can keep the roughness of the sliding surface low for a long period of time even as compared to the VC coating. As shown in FIGS. 5 and 6, it can be seen that the VCN pin excels in sliding characteristics and that the wear performance is improved as compared not only to the other hard coatings (TiC and CrC) but also to the VC pin.

Figure 7:
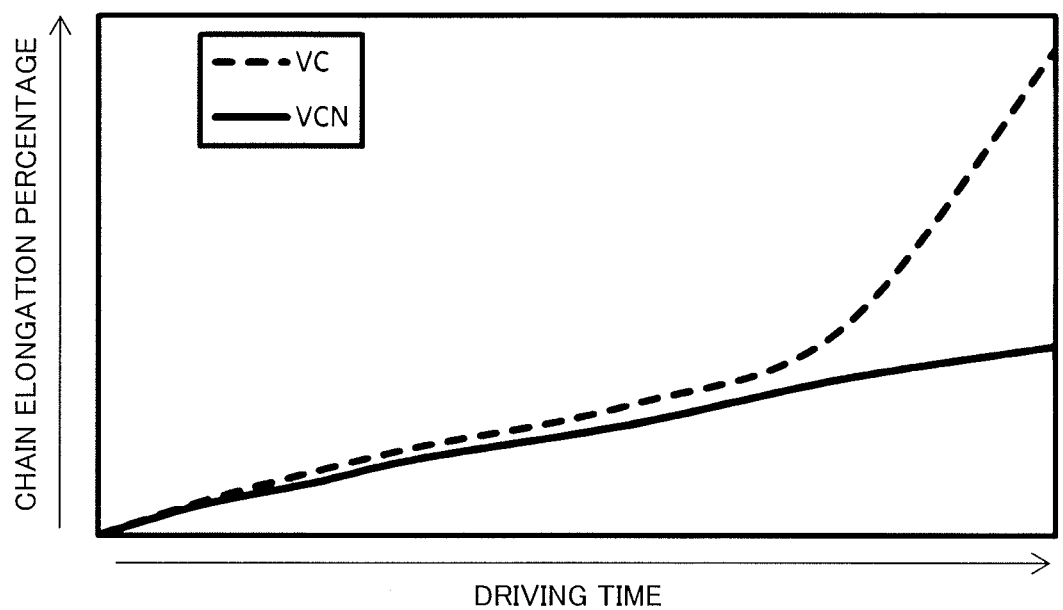
FIG. 7 is a graph illustrating wear elongation of a chain (VC chain) using the pin composed of the VC coating and a chain (VCN chain) using the pin composed of the VCN coating of the present invention.

FIG. 7 is a graph showing results of chain wear elongation tests carried out in a state in which a lubrication environment is aggravated assuming the next generation engine. In such an environment, the bearing locally generates heat and increases a contact pressure due to insufficient lubrication. As a result, a chain wear elongation percentage of the chain using the conventional VC chain increases sharply at a predetermined driving time. The chain using the VCN pin of the invention keeps substantially a constant chain wear elongation percentage across the entire test driving test time.

Figure 8:
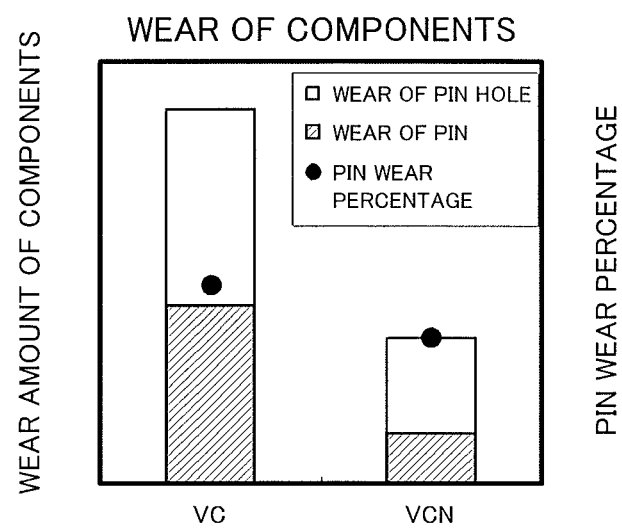
FIG. 8 is a graph showing wears between the VC and VCN chains and the bearing components.

FIG. 8 indicates wearing of components by the chains using the VC pin and the VCN pin. White-blanking parts indicate wear amounts of the pin holes of the inner link plate, i.e., the other member, hatched parts indicate wear amounts of the pins themselves, and black points indicate wear percentages of the pin holes and the pins. Under a high temperature environment caused by a lean lubrication, the VC coating produces the oxide (VO) film excessively grown as shown in FIGS. 3 and 4, and the soft and thick oxide film is apt to be quickly peeled off from the surface and causes quick wear of the pin itself. However, the VCN coating does not become thick by excessively growing the oxide (VO) film even if the VCN coating locally generates heat and becomes hot, and the oxide film which is kept at a predetermined thickness is less peeled off or damaged by keeping the slidable contact surface which is soft and has the mirror surface between the pin and the pin hole, i.e., the other member. Accordingly, the pin itself is not worn quickly. Thereby, as indicated by the wear amounts of the pins in FIG. 8, the wear amount of the VCN pin is small as compared to that of the VC pin.

As compared to the VC coating, the VCN coating has the high toughness as shown in FIG. 5 and has the low roughness of the sliding surface as shown in FIG. 6. Due to that, even if a relatively high contact pressure acts on the sliding surface of the bearing, the mirror surface whose surface roughness low of the pin surface layer 21 is kept and together with the oxide film 22 which is relatively thin as described above, the attackability of the pin surface layer 21 against the pin hole, i.e., the other member of the bearing, is low, and the wear amount of the pin hole of the inner link plate is low as compared to that of the chain using the VC pin. Accordingly, the pin wear amount and the pin hole wear amount, which cause the wear elongation of the chain, are both low in the case of the chain using the VCN pin as compared to the case of the chain using the VC pin, and the wear elongation of the chain using the VCN pin is small as compared to that of the chain using the VC pin.

As described above, because the thickness of the oxide film on the surface of the VCN pin is considerably thin as compared to that of the VC pin, the reduction of the pin wear amount is remarkable under a high temperature environment even though both the pin wear amount and the pin hole wear amount are reduced together. Therefore, the pin wear percentage of the VCN chain is low as compared to that of the VC chain.

Figure 9A:
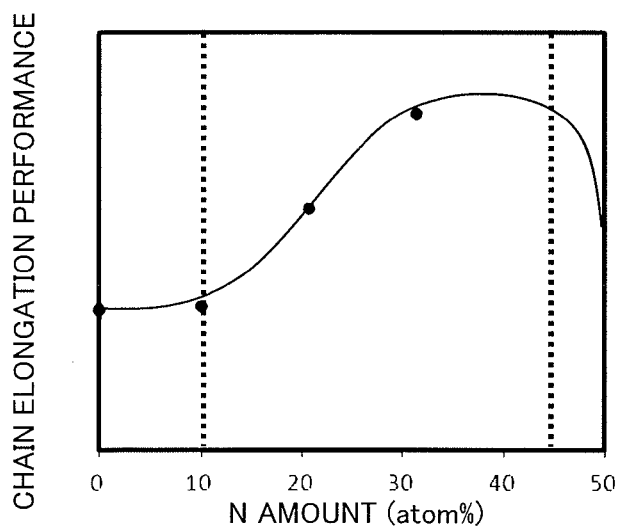
FIG. 9A is a graph showing a chain wear elongation performance by changes of an amount of nitrogen (N).
Figure 9B:
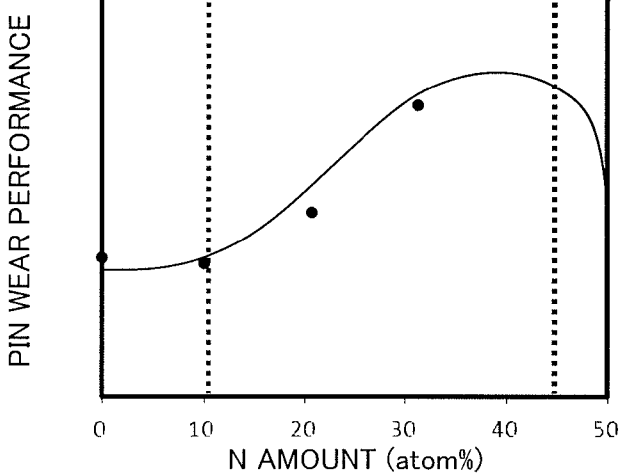
FIG. 9B is a graph showing a pin wear performance by the changes of the amount of N.
Figure 9C:
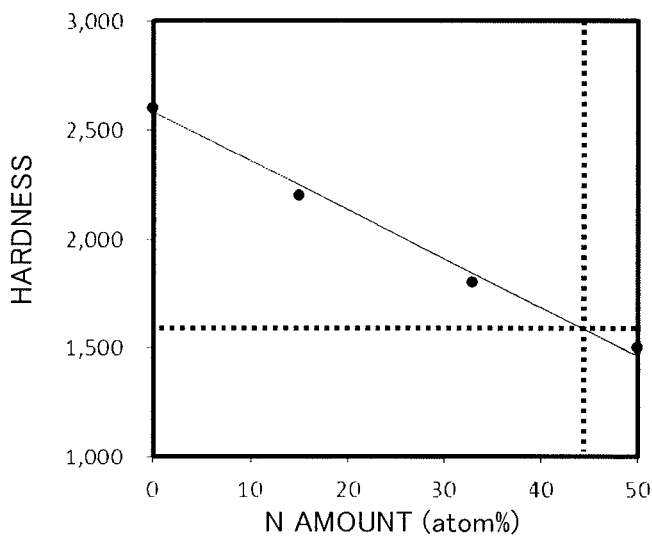
FIG. 9C is a graph showing changes of hardness of a surface of the pin by the changes of the amount of N.

Next, a nitrogen (N) ratio on the surface of the pin surface layer 21 composed of the VCN coating will be explained. Because N permeates from the surface of the pin by the nitriding treatment, the content (ratio) thereof is highest on the surface of the surface layer 21 and the content decreases gradually toward the interface of the base material as shown in FIG. 2B. As shown in FIG. 9A, the chain wear elongation performance increases along with an increase of the ratio of the N amount above 10 [atom %], saturates around an area where the N amount exceeds 30 [atom %], and decreases above 45 [atom %]. As shown in FIG. 9B, the pin wear performance increases along with the increase of the ratio of the N amount above 10 [atom %], saturates around the area where the N amount exceeds 30 [atom %], and decreases above 45 [atom %]. As shown in FIG. 9C, the greater the ratio of the N amount, the lower the surface hardness (Vickers hardness 0.1) of the pin surface layer 21 is. Hardness of soot mixed into engine oil is 800 to 1500 Hv, so that the hardness of the surface of the pin is preferable to be more than 1600 [Hv 0.1] by taking scars on the surface of the coating caused by the soot into account. Considering the above mentioned problems that the pin wear suppressing effect is insufficient if the ratio of nitrogen (N) on the surface of the pin surface layer is less than 10 [atom %], and that the hardness may be lowered by the soot generated within an internal combustion engine if the nitrogen (N) amount ratio is more than 45 [atom o], and the increase of the wear of the pin is concerned, the nitrogen (N) amount is preferable to be within a range of 10 to 45 [atom %].

Figure 10A:
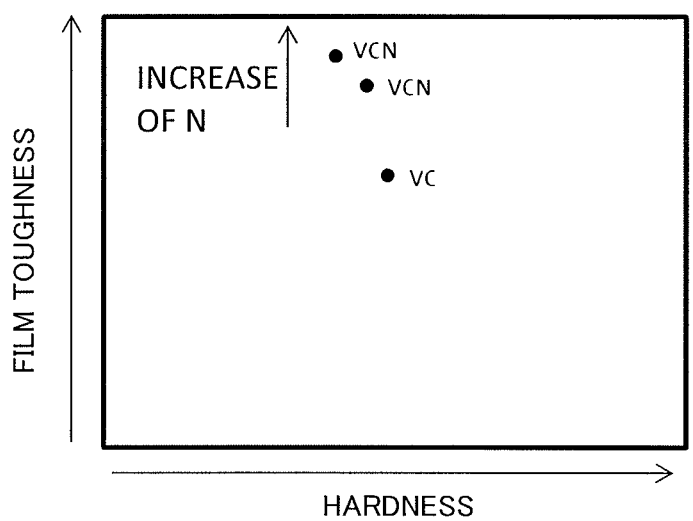
FIG. 10A is a graph showing changes of hardness and toughness of the surface layer caused by differences of the amount of N.
Figure 10B:
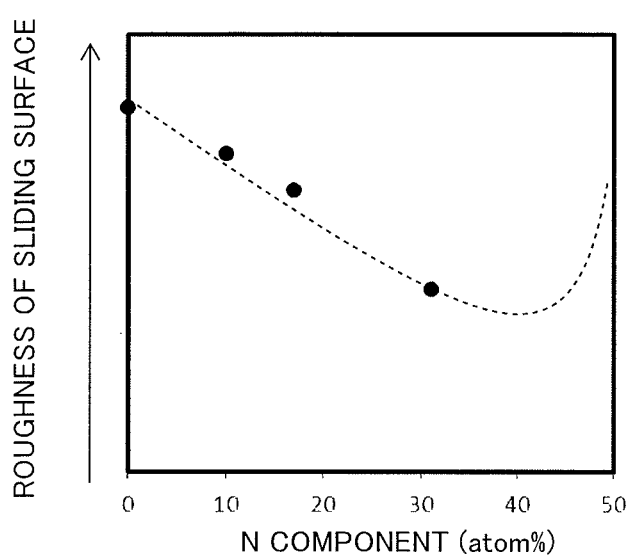
FIG. 10B is a graph showing changes of roughness of the sliding surface by the amount of N.

FIG. 10 indicates influences of the N amount on the sliding surface. As show in FIG. 10A, the more the N amount, the higher the toughness of the coating of the surface layer. Still further, as shown in FIG. 10B, the more the N amount, the smaller the roughness of the sliding surface is. Accordingly, it is preferable to increase the ratio of the N amount within the range less than the predetermined amount when the wear of the pin surface is concerned.

Although the wear amount of the pin composed of the VCN coating of the invention is small as compared to that of the VC pin, the pin wears gradually during its use. Although the effect of suppressing the oxide film from being excessively formed is also gradually reduced because the N amount on the surface layer 21 is gradually reduced from the surface toward the interface of the base material, the reduction changes slowly. Accordingly, it is possible to keep the mirror surface of the sliding surface of the pin for a long period of time and to prevent the VCN coating from being damaged and peeled off because there is no abrupt change point of the N amount. The pin composed of the VCN coating makes it possible, when applied to the chain within the next generation internal combustion engine in which the chain will be used under a severe environment in particular, to prolong a life of the chain with high reliability and to contribute to the sustainability of the global environment such as cutting of fuel consumption of the internal combustion engine.

Still further, if the member of the bearing having the surface layer composed of the VCN coating is a pin, the surface of the pin becomes a sliding surface sliding with the fitting member and the VCN coating is formed on the sliding surface, so that functions of the VCN coating can be efficiently expressed.

Still further, if the hardness of the surface layer of the member composing the bearing such as the pin is higher (1600 Hv or more in the present embodiment) than hardness of soot (800 to 1500 Hv) mixed into engine oil, it is possible to prevent the bearing such as the pin from being worn soon by being scratched by the soot even if such chain is applied to the chain for use within the internal combustion engine.

The pin wear suppressing effect of the vanadium carbonitride coating brought about by suppressing the vanadium oxide film from being excessively formed is insufficient if the nitrogen (N) content of the VCN coating is less than 10 [%] and the hardness of the VCN coating is insufficient if the N content is more than 45 [%], so that reliability of use as the chain within the engine cannot be assured. However, it is possible to assure the wear elongation and reliability of the chain by keeping the N content within a range of 10 to 45 [atom %].

The wear suppressing effect of the bearing such as the pin brought about by suppressing the oxide film from being excessively formed changes slowly because the content of nitrogen is gradually reduced from the surface due to wear of the surface, so that the mirror surface of the sliding surface of the bearing is kept for a long period of time. There is also no abrupt change point in the nitrogen amount, so that it is possible to prevent the coating from being peeled off.

According to the present embodiment, the VCN coating can be formed on the surface of the bearing of the chain by a step of forming the vanadium carbide coating on the surface of the base material and a step of permeating nitrogen on the surface of the base material after or simultaneous with the former step. More specifically, the VCN coating can be readily and steadily manufactured by permeating nitrogen to the VC coating by performing a nitriding treatment at 1000 [° C.] or more after performing the vanadium diffusing and permeating process by a powder pack method or the like. Still further, while the bearing of the silent chain is composed of the pin and the inner link plate, i.e., the fitting member and includes the pin hole slidably fitting the pin, the contact area of the pin hole is small and is sensitive in terms of the attackability of the pin against the other member. However, the attackability against the other member of the one member of the bearing such as the pin is lowered by the soft oxide film, and the increase of wear of the one member of the bearing such as the pin caused by the oxide film excessively formed is also lowered. Thus, it is possible to prolong a life of the silent chain with high reliability even under the severe environment by reducing wear of the both of the pin and the fitting member (surface of the pin hole of the inner link plate) in a well-balanced manner.

Although the surface layer composed of the VCN coating has been formed on the pin of the silent chain in the embodiment described above, the present invention is not limited to that and the surface layer may be formed at least one member among two members composing the chain bearing. For instance, instead of or in addition to the pin of the silent chain, the surface layer may be formed on an inner link plate or on a pin hole thereof in particular. Still further, the chain bearing of the invention is applicable not only to the silent chain but also to a chain in which first links each having a pin composing one member of a bearing and second links each having a fitting member composing another member of the bearing are connected endlessly by the bearings. For instance, in a case of the silent chain, the first link has a guide link plate and the second link has an inner link plate. In a case of a roller chain, a bearing is composed of a pin, i.e., one member, and a bushing which is another member composing a fitting portion (fitting member) fitting the pin, and a first link thereof has outer link plates and a second link thereof has inner link plates. The pin composed of the VCN coating is also applicable to all kinds of pins and is applicable also to a rocker pin for use in a rocker pin type silent chain for example.

Accordingly, the vanadium carbonitride (VCN) coating is disposed on the surface of at least one member composing the chain bearing. Thereby, because the VCN coating has high toughness as compared to other hard carbide coatings such as a vanadium carbide (VC) and chrome carbide (CrC), it is possible to reduce cracks from being produced and damages of the coating caused by the cracks and to keep the attackability against another member low by forming the oxide film that makes a mirror surface on the sliding surface and by keeping the mirror surface on the sliding surface for a long period of time. Nevertheless, the VCN coating eliminates a quick increase of wear of the bearing even under the severe environment such as lean lubrication by suppressing the oxide film from being excessively formed and can prolong a life of the chain even under a severe use condition such as the next generation engine by suppressing friction of the both members composing the bearing in which the members slide relatively with each other.

It is noted that while the present invention is preferably used for a timing chain that transmits rotations of a crankshaft to a camshaft within an internal combustion engine, the present invention is also applicable to a chain within an internal combustion engine including driving of a cam, a balancer, an oil pump and to a chain other than the chain within the engine.

That is, the chain bearing described above is capable of providing a highly durable chain even an under severe environment when it is used in a chain such as a silent chain and a roller chain. It is also possible to obtain a highly durable and reliable roller chain by applying the chain bearing described above to the roller chain whose bearing is composed of the pin and the bushing.

Still further, although the nitriding treatment has been performed at 1000° C. or more after forming the VC coating as the method for forming the VCN coating in the embodiment described above, the invention is not limited that method, and the VCN coating may be formed in a low temperature condition or in an ammonium atmosphere. The nitriding treatment may be performed in the same time with the formation of the VC coating. It is noted that not only V, C, N, but also other elements, e.g., titanium (Ti), silicon (Si), molybdenum (Mo), may be added and dissolved into the surface layer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A chain bearing comprising: two members slidably fitting with each other and flexibly connecting links, at least a first of the two members composing the chain bearing, including:
a base material;
a surface layer coating on a surface of the base material, at least a surface side of the surface layer coating being composed of a vanadium carbonitride coating which is formed of a compound containing vanadium, carbon and nitrogen; and
an oxide film formed on a surface of the surface layer coating such that the oxide film is interposed between the surface layer coating and a second of the two members, the oxide film being formed at a predetermined thickness and being softer than the vanadium carbonitride coating.

2. The chain bearing according to claim 1, wherein the two members are a pin and a fitting member rotatably fitting the pin, and
wherein the surface layer coating composed of the vanadium carbonitride coating is formed on the pin.

3. The chain bearing according to claim 1, wherein hardness of the surface layer coating composed of the vanadium carbonitride coating is 1600 [Hv] or more.

4. The chain bearing according to claim 1, wherein a content of nitrogen on the surface of the surface layer coating is 10 to 45 [atom %].

5. The chain bearing according to claim 4, wherein the content of nitrogen on the surface of the surface layer coating changes in inclination such that the content of nitrogen on the surface of the surface layer coating gradually drops from the surface of the surface layer coating to an interface with the base material.

6. The chain bearing according to claim 1, wherein the surface layer coating is composed of the vanadium carbonitride coating by permeating nitrogen on a vanadium carbide coating after forming the vanadium carbide coating on the surface of the base material.

7. The chain bearing according to claim 6, wherein the vanadium carbide coating is formed on the surface of the base material by performing a diffusion permeating process on the base material at a predetermined temperature within a gaseous atmosphere containing vanadium, and
wherein the vanadium carbonitride coating is formed by heating the base material on which the vanadium carbide coating has been formed within a nitrogen atmosphere at a temperature of 1000 [° C.] or more.

8. A chain pin flexibly connecting links, comprising:
a base material;
a surface layer coating on a surface of the base material, at least surface side of the surface layer coating being composed of a vanadium carbonitride coating which is formed of a compound containing vanadium, carbon and nitrogen; and
an oxide film formed on a surface of the surface layer coating, the oxide film being softer than the vanadium carbonitride coating, and being formed at a predetermined thickness.

9. A chain comprising:
a plurality of first links each having pins; and
a plurality of second links each having fitting portions fitting the pins, the second links being alternately connected with the first links by the pins fitting into the fitting portions,
each pin comprising:
a base material;
a surface layer coating on a surface of the base material, at least surface side of the surface layer coating being composed of a vanadium carbonitride coating which is formed of a compound containing vanadium, carbon and nitrogen; and
an oxide film which is softer than the vanadium carbonitride coating, is formed on a surface of the surface layer coating and has a predetermined thickness.

10. The chain according to claim 9, wherein each of the first links has guide link plates connected by a pair of the pins,
   wherein each of the second link includes inner link plates having pin holes as the fitting portions at both end portions thereof, and having a pair of teeth, and
   wherein the chain is a silent chain.

11. The chain according to claim 9, wherein at least one of the first links has outer link plates fixed by the pair of pins,
   wherein at least one of the second links includes a pair bushings as fitting members and inner link plates connected by the pair of bushings, and
   wherein the chain is a roller chain.

12. The chain according to claim 9, wherein the chain is a chain disposed within an internal combustion engine.

* * * * *